Figure 1:
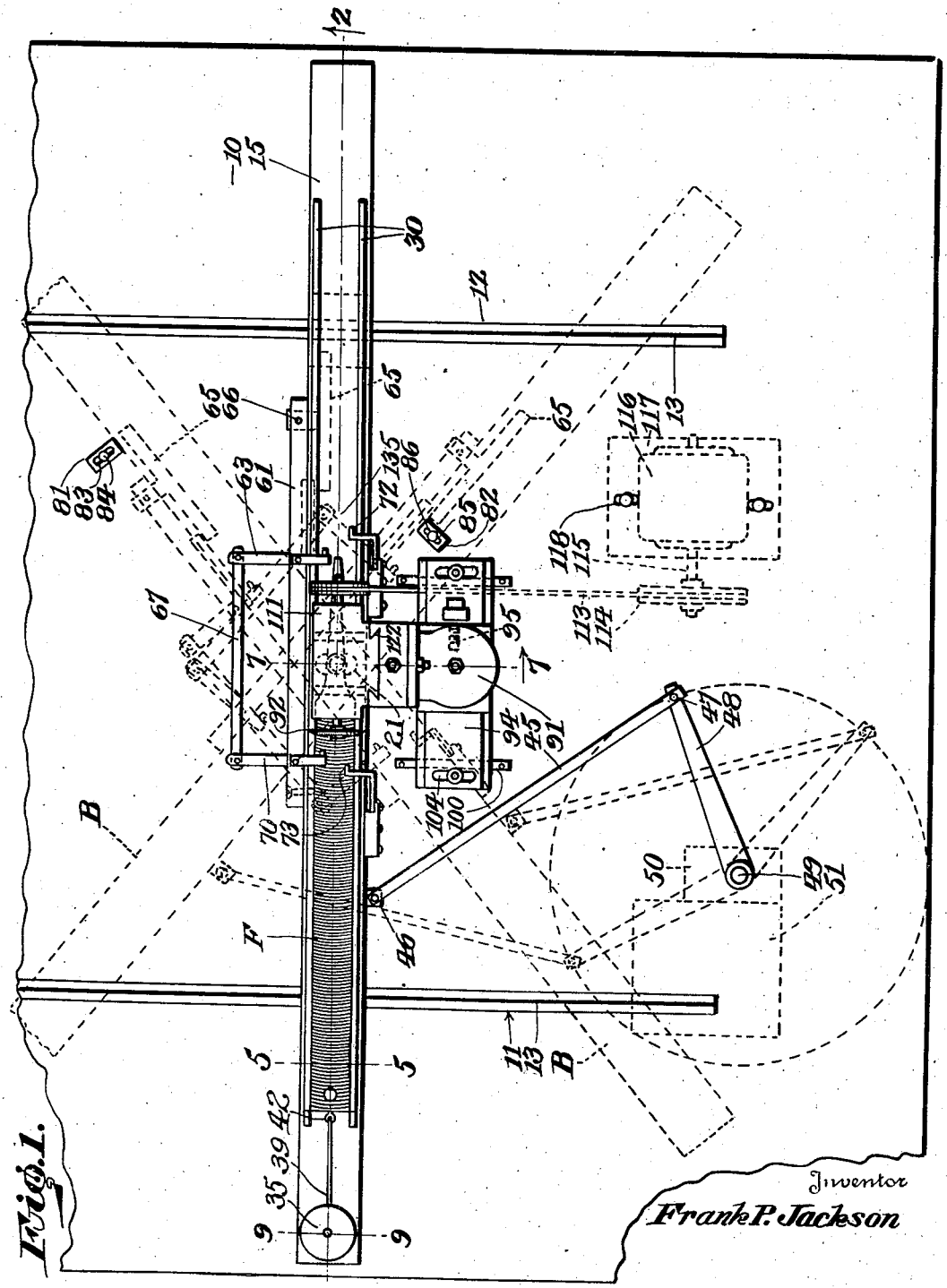

Nov. 19, 1940.  F. P. JACKSON  2,222,034
MACHINE FOR SHARPENING FILES
Filed June 5, 1939   3 Sheets-Sheet 1

Inventor
Frank P. Jackson
By Munn, Anderson & Liddy
Attorney

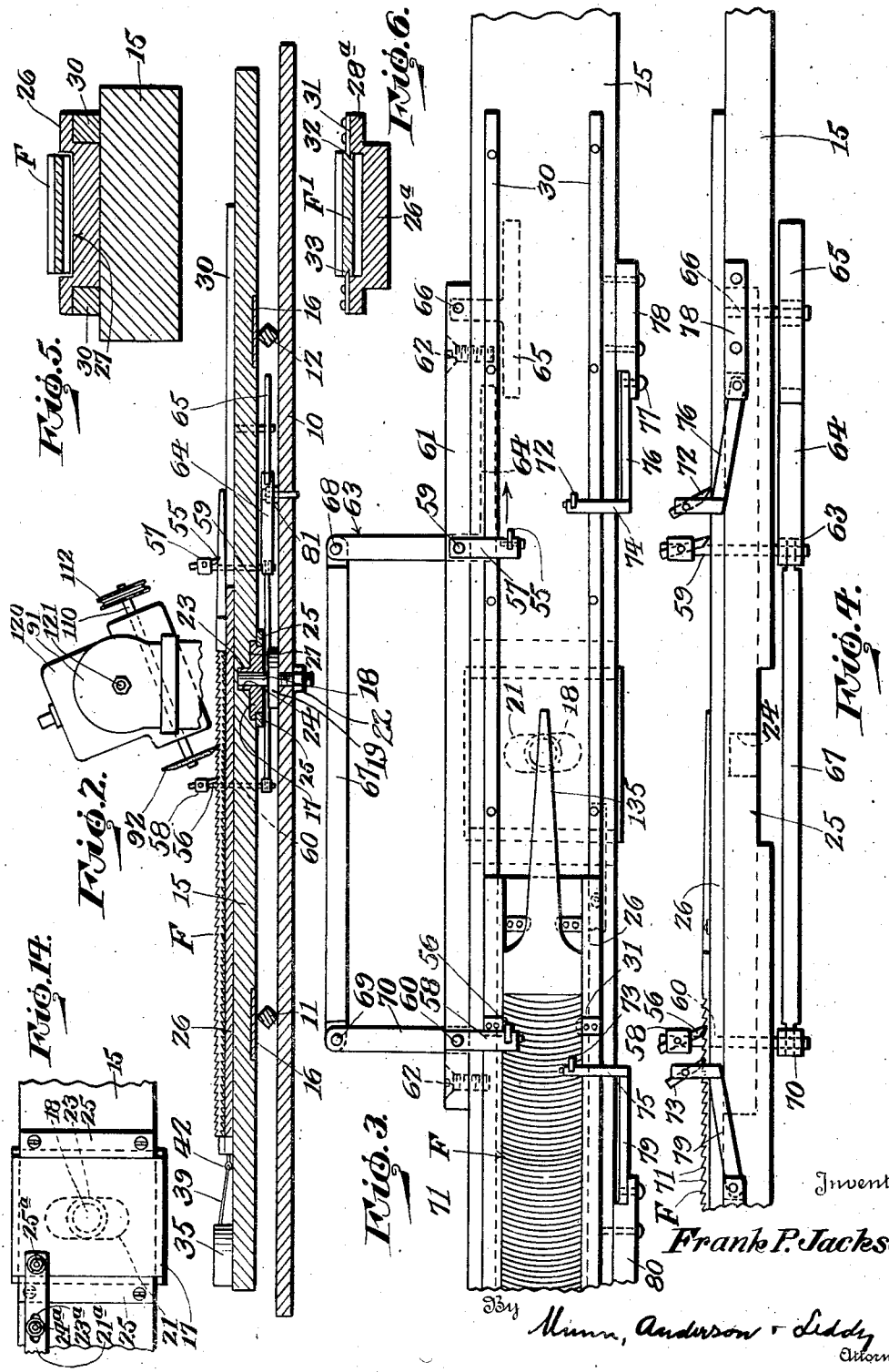

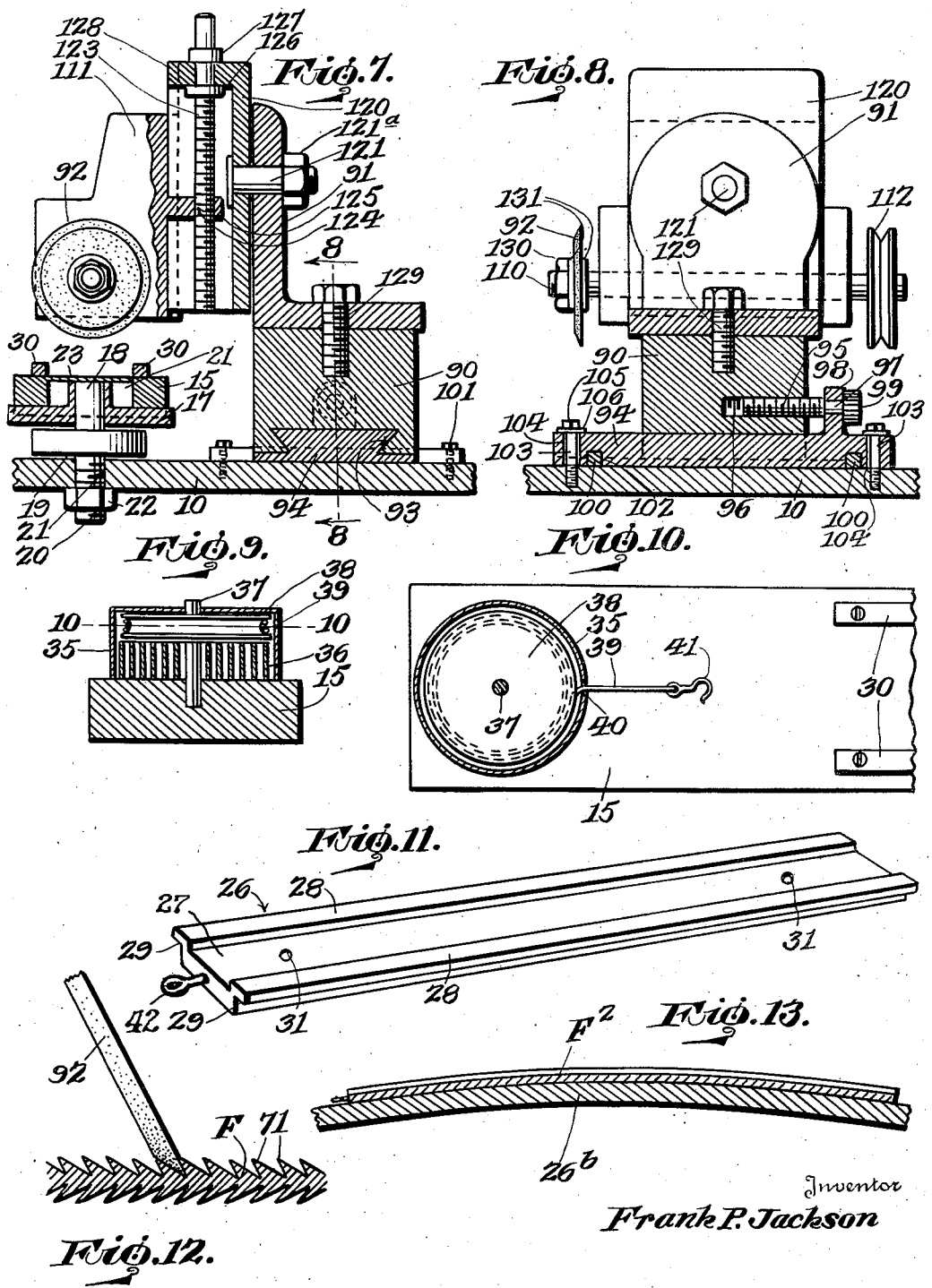

Patented Nov. 19, 1940

2,222,034

UNITED STATES PATENT OFFICE 2,222,034

MACHINE FOR SHARPENING FILES

Frank P. Jackson, Austin, Tex.

Application June 5, 1939, Serial No. 277,546

9 Claims. (Cl. 51—96)

This invention relates to machines for grinding files.

An object of the invention is the provision of a device for grinding the teeth of files in order to restore them to their former efficiency, the machine including a cutter which may be positioned at various angles so that when the file holder is oscillated beneath the cutter, the teeth of the file will follow the revolving edge of the cutter in accordance with the shape of the teeth, means being employed for moving the file longitudinally of the holder in accordance with the spacing of the teeth of the file.

Another object of the invention is the provision of a machine for sharpening the teeth of files, commonly known as "body" and "babbit," the file being mounted upon an oscillating holder which is moved across the path of a revolving cutter capable of being positioned at various angles to conform to the shape of the teeth of the file with a means operated by the oscillating holder for advancing the file and its holder so that a tooth may be operated upon one or more times depending upon the condition of the file, a resilient means being employed for maintaining the file in proper position every time that the file is advanced one tooth for the sharpening operation.

A further object of the invention is the provision of a machine for sharpening files of various types whether straight or bowed and including an oscillating arm having a holder for the file which is moved back and forth beneath a revolving cutter operated independently of the means for oscillating the arm, a plurality of adjustments being employed for properly positioning the cutter in accordance with the type of teeth on the file, pawls for advancing the file on the oscillating arm tooth by tooth being actuated by the movement of the oscillating arm when said arm reaches its extreme limit of movement at either side of the revolving cutter, stops being associated with the table supporting the cutter for setting in motion a means for causing actuation of the pawls, one of the stops being adapted to be moved to an inoperative position so that when necessary the file will remain stationary to permit the cutter to act on a tooth during the removal of the oscillating arm from its initial position, back and forth beneath the cutter, the stops when in operative position at opposite sides of the cutter causing the file to be advanced each time that the arm is oscillated across the path of the cutter so that the cutter will act on each tooth once.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 1 is a plan view of a cutting machine constructed in accordance with the principles of my invention, Figure 2 is a longitudinal vertical section taken along the line 2—2 of Fig. 1, Figure 3 is an enlarged plan view of the operating means for advancing the file for the cutting operations and shown in an inoperative position, Figure 4 is a fragmentary vertical side view of the device shown in Fig. 1, Figure 5 is a transverse vertical section taken along the line 5—5 of Fig. 1, Figure 6 is a transverse vertical section of the holder showing the modified form of retaining the file on the holder, Figure 7 is a transverse vertical section taken along the line 7—7 of Fig. 1, Figure 8 is a longitudinal fragmentary vertical section taken along the line 8—8 of Fig. 7, Figure 9 is a transverse vertical section taken along the line 9—9 of Fig. 1, Figure 10 is a horizontal section taken along the line 10—10 of Fig. 9, Figure 11 is a view in perspective of the file holder removed from an oscillating arm, Figure 12 is a fragmentary view in section showing the position of the cutter in engagement with the tooth of a file.

Figure 13 is a fragmentary vertical section showing a bowed oscillating arm for supporting a similarly-shaped file, and, Figure 14 is a fragmentary bottom plan view of the pivotal support for the oscillating arm.

Referring more particularly to the drawings, 10 designates a bed plate upon which are mounted a pair of parallel tracks 11 and 12 which are formed of hardened steel and which have low friction bearing tracks as shown by the edges 13 formed of hardened steel. These tracks are secured in any approved manner to the table 10. The table is supported in any approved manner above the floor of a building.

An oscillating arm 15 has plates 16 (Fig. 2) which are formed of wear-resisting material and since these plates are set in the pockets at the underface of the arm 15 they may be removed when necessary. These plates are so positioned that they will ride over the upper edge of the tracks 11 and 12.

The arm 15 (Figs. 2 and 7) is oscillatably supported at an intermediate point by means of an adjustable plate 17 which has a hub 23 rotatably mounted on an axle 18 and this axle is provided with a collar 19 resting upon the bed plate 10. A threaded portion 20 of the axle is screwed into an opening in the bed plate and passes through an elongated slot 21 in the arm 15. The collar 19 is drawn up tight on the bed plate by a nut 22 for securing said axle in position.

The plate 17 is slidably mounted in a channel 24 formed in the arm 15 (Figs. 2 and 7). Cleats 25 received by notched portions at the sides of the plate 17 retain said plate on the bottom face of said arm. A lever 21a has an elongated slot 23a receiving a screw 24a secured to the arm 15. The lever is pivoted at 25a on the plate 17 so that when the free end of the lever 21a is rocked the arm 15 will be moved laterally at either side of the axle 18 for coordinating the exact center of the arc of the circle of the file tooth with the center of oscillation of the arm 15. After the adjustment has been made the screw 24a is tightened to hold the arm centered. Any suitable type of bearings may be employed between the axle 18, the hub 17 and the collar 19, if desired.

A file holder 26 (Fig. 11) consists of an elongated bar having a centrally and longitudinally disposed channel 27 to receive a file F. Flanges 28 project laterally from the bar 26 and in substantially the same plane with the channel 27 to form angularly-shaped grooves 29 which are received by longitudinally disposed tracks 30 mounted upon the oscillating arm 15 so that when the holder 26 is moved along said arm it will be guided in a definite direction. This holder is provided with threaded openings 31 to receive threaded bolts which pass through openings in the file to secure the file rigidly to the holder. While the grooves 29 and the tracks 30 are shown as having right angular faces, these faces may be inclined at an acute angle to form a dove-tailed connection between a holder and the oscillating arm 15.

Referring more particularly to Fig. 6, it will be seen that a modified form of the securing means for the files is provided and a holder 26a has cleats 31 removably secured to the flanges 28a and the pointed ends 32 of these cleats are adapted to be received by notches 33 formed in the longitudinal walls of a file F'. Various types of means may be employed for securing the file to the holder without departing from the spirit of the invention.

In order to maintain the file when it is being operated in a predetermined position during the cutting operation, a resilient means is employed and this means consists of a housing 35 secured to one end of the oscillating arm 15 (Figs. 9 and 10). A coil spring 36 is located in the housing and is wound up with one end being connected to a shaft 37 while the other end is connected to the housing. A grooved pulley 38 is secured to the shaft 37 within the housing 35 upon which is wound a cable 39 which extends through an opening 40 in the housing and is provided with a hook 41 adapted to be received by an eye 42 secured to the adjacent end of the holder 26 so that the spring will always tend to pull the holder towards the housing 35 during the cutting operation.

The arm 15 is oscillated by means of a link 45 (Fig. 1) which is pivotally connected to a lug 46 projecting from one side of said arm. This shaft is operated through a transmission mechanism or speed reducer 50 and a motor 51 and all of these parts are carried by the standards in the usual manner which support the work table 10. The motor may be of any type but preferably an electrical motor is employed for the purpose. The link 45 has a pivotal connection at 47 with an arm or lever 48 secured to a shaft 49. This shaft is revolved by a speed reducer 50 operated by the motor 51. The motor, speed reducer and shaft are located beneath the work table 10 and are carried by the usual framework which supports said table. A circle in dotted lines represents the path through which the pin or pivotal connection 47 moves during the rotation of the shaft 29. The dotted line positions of the arm 15 and the link 45 indicates the extreme positions of these members during a complete rotation of the lever 48.

The file is advanced periodically either once during the rotation of the lever 48 or twice, depending upon the condition of the file. If the file is in poor condition, the teeth of the file are sharpened twice during each rotation of the lever 48. Otherwise the file is advanced every 180° of rotation of the arm, so that each tooth is sharpened during half of the complete oscillating movement of the arm 15.

The file is advanced by means of pawls 55 and 56 (Figs. 1 to 4, inclusive), which engage the teeth of the file so that when these pawls advance one step, the file will be advanced likewise one step as well as the holder 26 against the tension of the spring 36 towards the right in Fig. 2.

The pawls 55 and 56 are mounted in horizontally disposed arms 57 and 58 which extend horizontally and have their free ends carrying the pawls located over the file holder 26 so that the pawls may engage the teeth of the file for periodically shifting the file longitudinally of the arm 15. These arms are secured to the upper ends of the respective rock shafts 59 and 60 which are mounted in bearings in a bar 61 extending longitudinally of the arm and secured to one side edge of said arm by a threaded bolt 62. A ball crank lever 63 is rigidly secured to the shaft 59 below the bottom of the arm 15 and above the upper surface of the work table 10. The free end of the arm 64 of the bell crank lever 63 has its free end located adjacent a T-shaped lever 65 which is pivotally mounted at 66 on one end of the bar 61. A link 67 has one end pivotally connected, respectively, with the bell crank 63, as shown at 68. The other end of the link 67 is pivotally connected at 69 with a lever 70 rigidly connected to a shaft 60 and located below the oscillating arm 15, as shown in Figs. 2 and 4. Thus it will be seen when the arm 64 of the bell crank 63 is rocked the link 67 will impart a similar rocking motion to the lever 70 so that both pawls 55 and 56 when engaged with the teeth 71 of the file F will shift the file a distance equal to the space between a pair of the teeth.

A pair of retaining pawls 72 and 73 are carried by horizontally disposed arms 74 and 75, respectively, which extend over the face of the file F and are adapted to engage the teeth of the file for retaining the file against movement longitudinally. The arm 74 is rigidly connected with a weighted lever 76 and this lever is pivotally mounted at 77 on a block 78 secured to the side wall of the oscillating arm 15 and opposite the bar 61.

The arm 75 is rigidly connected with a weighted lever 79 which is pivotally mounted on a block 80 secured to the side wall of the arm 15.

A pair of stops 81 and 82 are secured to the work table 10 in spaced relation on radii passing through the center of the axle 18 with the radius extending from the said center to the center of the block 82 being less in length than the radius extending between the center of said axle to the center of the block 81. The block 81 is provided with an elongated slot 83 to receive a bolt 84 which is threaded into the top 10 so that said block may be adjusted toward or away from the position shown in Fig. 1 whereby it may be moved to a position so that the T-shaped lever 65 will not be engaged by said block. This is also true of the block 82 which has an elongated slot 85 to receive a bolt 86 threaded into a passage in the top 10. The block 82 is in a position to directly engage the arm 64 of the bell crank lever 63 while the block 81 engages one end of the T-shaped lever 65 so that when this lever is rocked the opposite end will engage the arm 64 of the bell crank 63 and rock said bell crank for a purpose which has been explained.

A block 90 for adjustably supporting a bracket 91 which carries a cutter 92 has a dove-tailed slot 93 receiving a complementarily formed guide 94 so that the block 90 may be shifted longitudinally of the member 94 for adjusting the position of the cutter 92 longitudinally of the file F carried by the arm 15, as shown more particularly in Figs. 1, 7 and 8.

A bolt 95 is threaded into a passage 96 in the block 90 and has a reduced portion 97 received within a bearing bracket 98. An operating head 99 is secured to the outer end of the bolt for rotating said bolt to cause the block 90 to move longitudinally of the top 10 for properly adjusting the cutter 92 with respect to the teeth running transversely of the file F.

In order to center the cutter with respect to the teeth of the file the guide 94 is adapted to be adjusted along a line which is at right angles to the adjustment of the block 90. A pair of rails 100 are secured at 101 to the top 10 and these rails are received by grooves 102 formed in the bottom face of the member 94 which is held in place on the table by means of bolts 103 passing through elongated slots 104 formed in the opposite ends of the member 94, as shown in Fig. 8. A washer 105 is located between the upper surface of the member 94 and a head 106 formed at the outer end of each of the bolts 103. After the member 94 has been properly positioned, the bolts are tightened for rigidly holding said member against movement.

The cutter 92 is mounted on a shaft 110 which extends through a bearing block 111 and is provided with a pulley 112 at the oposite end. A belt 113 is trained on the pulley 112 and also a pulley 114 driven by a shaft 115 is connected with a motor 116. This motor is carried in any approved manner upon the framework which normally supports the work table 10. The motor is provided with the usual slotted base 117 with bolts 118 securing the case in position but permitting longitudinal adjustment of the base for properly positioning the motor when necessary.

The bearing block 111, the shaft 110 and the cutter 92 have a sliding connection with an auxiliary bracket 120 which is pivotally mounted on a bolt 121 carried by the bracket 91. The bearing block, as shown more particularly in Fig. 1, has a dove-tailed connection as shown at 122 with the bracket 120 so that the block 111 may be adjusted vertically when desired. A threaded bolt 123 is threaded into an opening 124 on an arm 125 projecting from the block 111 and the upper end of this bolt has a pair of collars 126 and 127 embracing opposite sides of an extension 128 of the bracket 120 so that this bolt may be revolved and as the bolt is threaded into the arm 125 the block 111 may be adjusted vertically by rotating a head on the outer free end of the bolt 123.

The lower end of the bracket 91 is secured by means of a bolt 129 to the adjustable block 90.

The cutting disc 92 may be adjusted relative to the vertical means of the nut 130 and the washers 131 in order to properly position the cutter so that it will efficiently sharpen the teeth of the file.

The operation of my device is as follows: The file F is placed in the holder 26 and secured either by means of bolts passing through openings in the file and threaded into openings 30 and 31 in said holder which are formed in the base of the channel 27. After the file has been placed in the channel various adjustments are made so that the sharpening wheel 92 will be properly positioned with respect to the teeth of the file and any of these adjustments may be made by moving the block in two directions at right angles to each other and further adjustments may be made by properly positioning the bearing block 111 through the medium of the bolt 121 and the nut 121a. The vertical position of the cutter is adjusted by manipulating the bolt 123.

The angular position of the cutter as shown in Fig. 2 is made by rocking the bracket 120 to the proper angle after the nut 121a has been loosened. After this the nut is tightened and the wheel 92 will maintain its proper angular relation with the teeth of the cutter.

The file after it has been placed within the holder 26 is moved along the arm 15 against the tension of the spring 36 in the housing 35 until the first tooth adjacent the handle 135 is positioned in operative relation with the wheel 92. At this time the outer pawl 73 will engage a tooth a short distance away from the cutter wheel 92 and maintains the file against rearward motion by the tension of the spring 36. At this time the advancing or actuating pawl 56 is in engagement with a tooth adjacent the pawl 73 which is in engagement with a tooth of the file so that the parts are in operative position to start the motors 51 and 116.

When the motors begin to operate, the arm 48 will move the link 45 to cause oscillation of the arm 15 and this arm moves between the dotted line positions shown in Fig. 1 and across the path of the revolving cutter. The stops 81 and 82 are in a position to be engaged respectively by the T-shaped lever 65 and the arm 64 of the bell crank 63 when the arm reaches its limit of movement of oscillation. A tooth is acted upon by the cutter when the arm 15 moves from the dotted line position indicated at A to the dotted line position indicated at 3 in Fig. 1. When the opposite end of the arm reaches the dotted line position as indicated by B, the arm 64 of the bell crank 63 will be engaged by the stop 82 and the bell crank lever will be rocked as will be the levers 70 through the connecting link 67. When these levers are rocked the arms 57 are moved in the direction indicated by the arrow in Fig. 3 so that the pawls 56 will move the file F the distance amounting to the space between a pair of teeth so that when the pawl 73 falls behind the next tooth the pawl 56 will also drop into the tooth directly behind the tooth which has been treated until the oscillating arm 15 is moved over to the stop 81 whence the T-shaped lever 65 will be rocked and this in turn rocks the bell crank lever again for advancing the file one step against the tension of the spring 36.

As soon as the teeth adjacent the handle 134 of the file reach the pawl 55 both pawls 55 and 56 will operate to advance the file. At each completion of the movement of the file step by step the pawl 73 will engage a tooth and hold the file against slippage. When the file is sufficiently advanced both pawls 72 and 73 will engage the teeth of the file for retaining the file against slippage.

The operation just described where a pair of teeth are sharpened by the to and fro movement of the oscillating arm 15, the file is in such condition that only one cutting operation is required for each tooth. On the other hand where the file is in such condition that it is necessary to move the teeth of the file back and forth under the cutter before the teeth are properly sharpened, one of the stops 81 or 82 is moved out of position so that it will not be engaged by the relative operating elements on the arm 15 whereby the arm will be rocked back and forth and the cutter will act on the tooth at each oscillation of the arm.

After the various adjustments have been made for the cutter 92 it may be necessary to tighten or loosen the belt 113 and this is done by adjusting the position of the motor 116.

Referring more particularly to Fig. 13, it will be seen that the holder 26b is curved to conform to the curvature of the file F2 known as a "body" type.

The carriage or arm 15 moves the file F to the limits of movement of the arms upon opposite sides of a line passing through the center of the table top 10 beyond the confines of the grinding wheel 92 so that the file may be advanced when the teeth of the file are out of contact with the grinding wheel.

I claim:

1. A file sharpening machine comprising an oscillatable carriage, means slidably supporting a file on said carriage, a grinding wheel rotatably mounted to engage the teeth of the file, means rotating the wheel, means periodically oscillating the carriage beneath the wheel, means engaging the teeth of the file for advancing the file supporting means and the file along the carriage step-by-step, means operated when the carriage is oscillated for actuating the advancing means, said wheel being inclined to the vertical, and means adjustably positioning the angle of inclination of the wheel relative to the teeth.

2. A file sharpening machine comprising an oscillatable carriage, means slidably supporting a file on said carriage, a grinding wheel rotatably mounted to engage the teeth of the file, means rotating the wheel, means periodically oscillating the carriage beneath the wheel, means engaging the teeth of the file for advancing the file supporting means and the file along the carriage step-by-step, means operated when the carriage is oscillated for actuating the advancing means, a table upon which the carriage is oscillatably mounted, a block mounted on the table at the center of oscillation of the carriage, a shaft carried by the block, said wheel being mounted on the shaft.

3. A file sharpening machine comprising a table, an oscillatable carriage, means pivotally mounting the carriage on the table, a holder slidably supporting a file on the carriage, a bell crank pivotally mounted on the carriage and provided with a pawl for advancing the holder and file along the carriage step-by-step, means retaining the file in position at each advanced step, a lever pivoted on the carriage and provided with a pawl engaging a tooth on the file, a link connecting said lever with the bell crank, means causing rocking of the bell crank at the limit of oscillation of the carriage, means oscillating the carriage through a predetermined angle, a grinding wheel contacting the teeth of the file as it rocked to and fro, and means rotating the wheel.

4. A file sharpening machine comprising a table, an oscillatable carriage, means pivotally mounting the carriage on the table, a holder slidably supporting a file on the carriage, a bell crank pivotally mounted on the carriage and provided with a pawl for advancing the holder and file along the carriage step-by-step, means retaining the file in position at each advanced step, means causing rocking of the bell crank at the limit of oscillation of the carriage, means oscillating the carriage through a predetermined angle, a grinding wheel contacting the teeth of the file as it is rocked to and fro, and means rotating the wheel.

5. A file sharpening machine comprising a table, an oscillatable carriage, means pivotally mounting the carriage on the table, a holder slidably supporting a file on the carriage, a bell crank pivotally mounted on the carriage and provided with a pawl for advancing the holder and file along the carriage step-by-step, means retaining the file in position at each advanced step, means causing rocking of the bell crank at the limit of oscillation of the carriage, means oscillating the carriage through a predetermined angle, a grinding wheel contacting the teeth of the file as it is rocked to and fro, means rotating the wheel, and spaced tracks mounted on the table and supporting the oscillating arm above the table.

6. A file sharpening machine comprising a table, an oscillatable carriage, means pivotally mounting the carriage on the table, a holder slidably supporting a file on the carriage, a bell crank pivotally mounted on the carriage and provided with a pawl for advancing the holder and file along the carriage step-by-step, means retaining the file in position at each advanced step, means causing rocking of the bell crank at the limit of oscillation of the carriage, means oscillating the carriage through a predetermined angle, a grinding wheel contacting the teeth of the file as it is rocked to and fro, means rotating the wheel, resilient means on the carriage connected to the holder for urging said holder in an opposite direction from the advancement by the pawl.

7. A file sharpening machine comprising a table, an oscillatable carriage, means pivotally mounting the carriage on the table, a holder slidably supporting a file on the carriage, a bell crank pivotally mounted on the carriage and provided with a pawl for advancing the holder and file along the carriage step-by-step, means retaining the file in position at each advanced step, a lever pivoted on the carriage and provided with a pawl engaging a tooth on the file, a link connecting said lever with the bell crank, spaced stops mounted on the table and located at the limits of movement of the oscillating carriage, means on the arm and engageable with one of the stops for causing actuation of the bell-crank, the other stop adapted to be engaged directly by the bell crank for causing actuation of the bell crank, means oscillating the carriage through a predetermined angle, a grinding wheel contacting the teeth of the file as it is rocked to and fro, and means rotating the wheel.

8. A file sharpening machine comprising a table, an oscillatable carriage, means pivotally mounting the carriage on the table, a holder slidably supporting a file on the carriage, a bell crank pivotally mounted on the carriage and provided with a pawl for advancing the holder and file along the carriage step-by-step, means retaining the file in position at each advanced step, a lever pivoted on the carriage and provided with a pawl engaging a tooth on the file, a link connecting said lever with the bell crank, spaced stops mounted at the limits of movement of the oscillating carriage, means on the arm and engageable with one of the stops for causing actuation of the bell crank, the other stop adapted to be engaged directly by the bell crank for causing actuation of the bell crank, means oscillating the carriage through a predetermined angle, a grinding wheel contacting the teeth of the file as it is rocked to and fro, and means rotating the wheel, said stops being adjustably mounted so that one of the stops may be moved out of the path of the carriage whereby each tooth of the file will be advanced by the back and forth movement of the carriage.

9. A file sharpening machine comprising a table, an oscillatable carriage, means pivotally mounting the carriage on the table, a holder slidably supporting a file on the carriage, a bell crank pivotally mounted on the carriage and provided with a pawl for advancing the holder and file along the carriage step-by-step, means retaining the file in position at each advanced step, a stop mounted on the table in the path of the oscillating carriage, means on the carriage adapted to be engaged by the stop and bell crank and actuating the pawl to move the file holder step-by-step at each complete oscillation of the carriage, means oscillating the carriage through a predetermined angle, a grinding wheel contacting the teeth of the file as it is rocked to and fro, and means rotating the wheel.

FRANK P. JACKSON.